(12) United States Patent
Matsumae

(10) Patent No.: US 10,218,877 B2
(45) Date of Patent: Feb. 26, 2019

(54) IMAGE PROCESSING APPARATUS, AND IMAGE PROCESSING METHOD

(71) Applicant: KYOCERA Document Solutions Inc., Osaka-shi, Osaka (JP)

(72) Inventor: Keisaku Matsumae, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 183 days.

(21) Appl. No.: 15/033,585

(22) PCT Filed: Oct. 29, 2014

(86) PCT No.: PCT/JP2014/078707
§ 371 (c)(1),
(2) Date: Apr. 29, 2016

(87) PCT Pub. No.: WO2015/064609
PCT Pub. Date: May 7, 2015

(65) Prior Publication Data
US 2016/0269592 A1 Sep. 15, 2016

(30) Foreign Application Priority Data
Oct. 31, 2013 (JP) ................................. 2013-226854

(51) Int. Cl.
*H04N 1/387* (2006.01)
*H04N 1/393* (2006.01)
*H04N 1/23* (2006.01)

(52) U.S. Cl.
CPC .......... *H04N 1/3875* (2013.01); *H04N 1/233* (2013.01); *H04N 1/2384* (2013.01);
(Continued)

(58) Field of Classification Search
CPC .... H04N 1/3875; H04N 1/393; H04N 1/2384; H04N 1/233; H04N 1/3873; H04N 2201/0094
(Continued)

(56) References Cited

U.S. PATENT DOCUMENTS

2011/0310421 A1* 12/2011 Itoh ........................ H04N 1/387
358/1.13

FOREIGN PATENT DOCUMENTS

JP 2001016425 A 1/2001
JP 2009094925 A 4/2009
(Continued)

OTHER PUBLICATIONS

ISA Japanese Patent Office, International Search Report Issued in Application No. PCT/JP2014/078707, dated Dec. 22, 2014, WIPO, 3 pages.

*Primary Examiner* — Justin V Lewis
(74) *Attorney, Agent, or Firm* — Alleman Hall Creasman & Tuttle LLP

(57) ABSTRACT

An image processing apparatus includes an image acquiring portion, a pair generating portion, first through third determination portions, and an image combining portion. The image acquiring portion acquires an image for each page of a booklet. The pair generating portion arranges the images in order of the pages of the booklet, and generates pairs from the arranged images, each pair being a pair of adjacent pages in a spread state of the booklet. The first determination portion determines whether a drawn image is present in a band-like region including a boundary between two images in each of the pairs. The second determination portion determines whether there is drawing continuity between the two images. The third determination portion determines whether the two images have to be combined, on the basis of determination results of the first and second determination (Continued)

portions. If so, the image combining portion combines the two images.

6 Claims, 17 Drawing Sheets

(52) U.S. Cl.
CPC .......... *H04N 1/3873* (2013.01); *H04N 1/393* (2013.01); *H04N 2201/0094* (2013.01)

(58) Field of Classification Search
USPC ............. 270/52.01, 52.14; 412/9, 11, 13, 14
See application file for complete search history.

(56) References Cited

FOREIGN PATENT DOCUMENTS

| | | | |
|---|---|---|---|
| JP | 2012004859 | A | 1/2012 |
| JP | 5327492 | B1 | 10/2013 |

\* cited by examiner

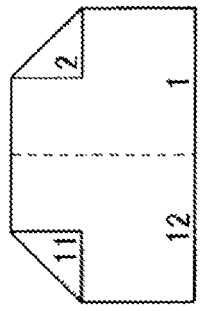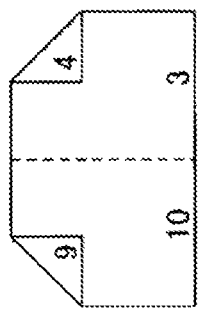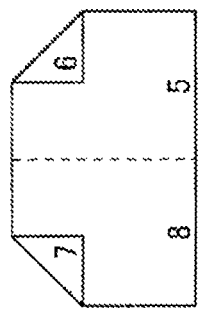
FIG. 4A

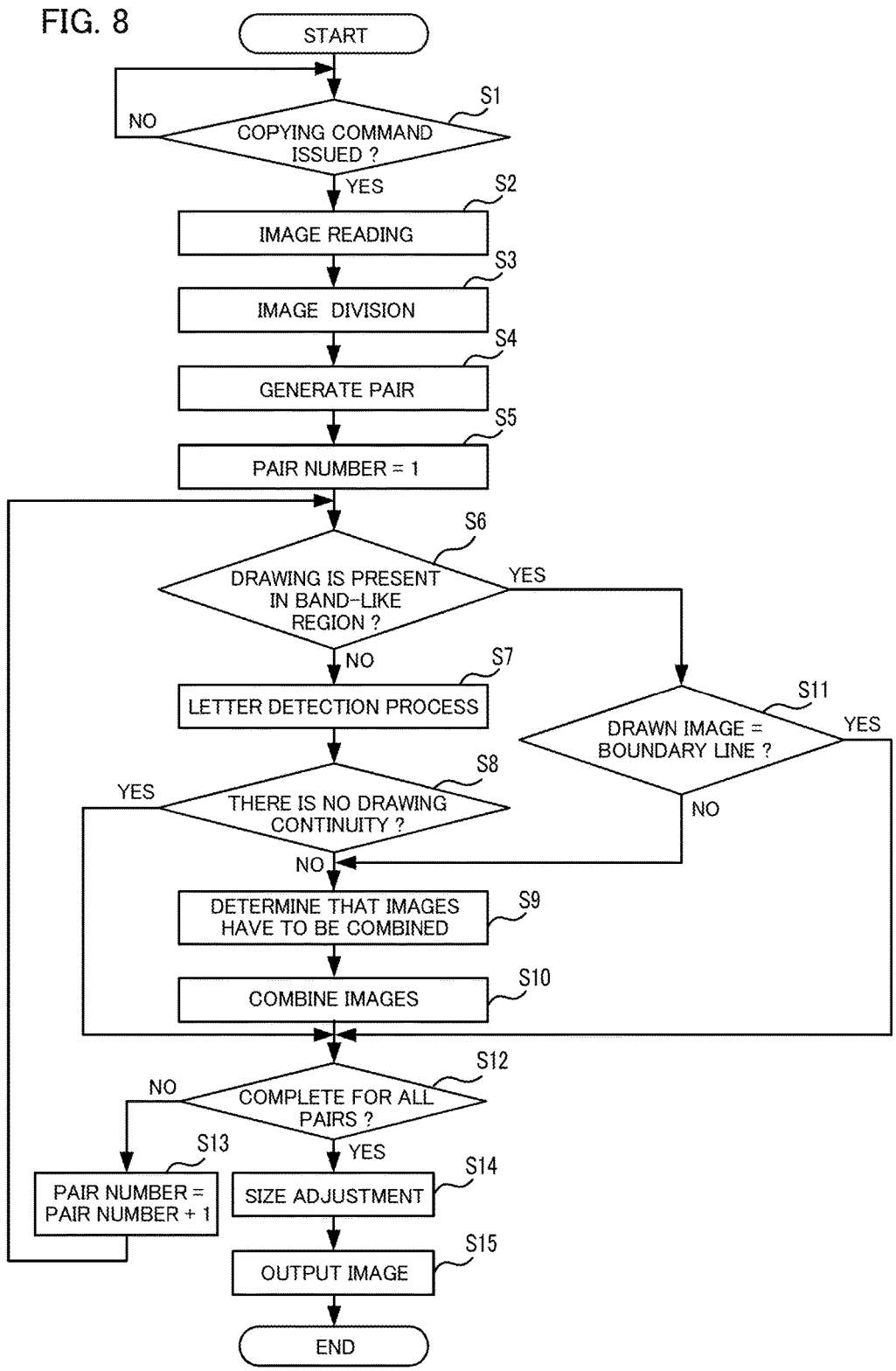

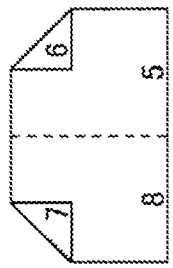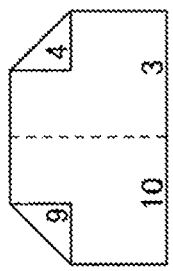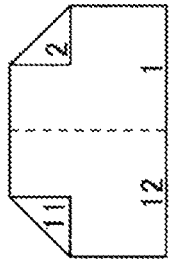
FIG. 9A

IMAGE PROCESSING APPARATUS, AND IMAGE PROCESSING METHOD

TECHNICAL FIELD

The present invention relates to an image processing apparatus and an image processing method that execute an image process to an image of a document composing a booklet.

BACKGROUND ART

There has been known a document reading/recording apparatus that copies spread documents of a so-called saddle-stitched booklet, which is formed by binding a plurality of documents folded in half in a stacked state at a folding line at the center in the longitudinal direction or in the vicinity thereof, to obtain a saddle-stitched booklet (for example, see Patent Literature 1 described below). When reading the saddle-stitched booklet for each spread, the document reading/recording apparatus divides the read image into images of respective pages. Next, regarding the divided read images (division images) corresponding to the respective pages, the document reading/recording apparatus sets a pair of two division images which should be aggregated on a sheet surface of each print sheet, in order of pages of a saddle-stitched booklet to be newly created. Then, based on the pair, the document reading/recording apparatus prints each image onto each sheet surface of a print sheet.

CITATION LIST

Patent Literature

[PTL 1] Japanese Laid-Open Patent Publication No. 2001-16425

SUMMARY OF THE INVENTION

Problems to be Solved by the Invention

Meanwhile, as a type of a booklet to be newly created, there is a so-called side-stitched booklet formed by binding documents, on which images are printed on both of the front and back surfaces, at one side. On the other hand, copying manners for copying a booklet include: a first copying manner in which a booklet is copied in a spread state as described above; and a second copying manner in which each of documents separated from each other by unbinding a booklet is copied.

It is supposed here that images in the respective pages obtained by copying a side-stitched booklet with the first copying manner or images in the respective pages obtained by copying a saddle-stitched booklet with the first copying manner or the second copying manner and performing the dividing process are printed on different print surfaces to create the side-stitched booklet.

In this case, there may be a case where, even when drawn images in two pages horizontally adjacent to each other in a saddle-stitched booklet or a side-stitched booklet which is to be copied have continuity or relevancy, these drawn images may printed on a front surface and a back surface of one sheet in a side-stitched booklet which is to be newly created. If the images in two pages in which the drawn images have continuity or relevancy as described above are printed on a front surface and a back surface of one sheet, the drawn images in two pages horizontally adjacent to each other in the booklet which is to be copied are not horizontally adjacent to each other in the newly created booklet. Such drawn images have to be visually recognized as a drawn image with a sense of unity by a user. However, if the drawn images are not horizontally adjacent to each other, the user cannot visually recognize these drawn images as an aggregate.

In addition, even if these images are printed to be horizontally adjacent to each other, these images are printed as individual images. Therefore, a booklet which is to be newly created often includes images which makes a user feel uncomfortable, such as occurrence of relatively large misalignment between images in the left and right pages.

The present invention is accomplished in view of the above problem, and an object of the present invention is to provide an image processing apparatus and an image processing method capable of generating an image having satisfactory image quality from an image in each page acquired from a booklet.

Solution to the Problems

An image processing apparatus according to one aspect of the present invention includes an image acquiring portion, a pair generating portion, a first determination portion, a second determination portion, a third determination portion, and an image combining portion. The image acquiring portion acquires an image for each of pages of a plurality of documents composing a booklet. The pair generating portion arranges a plurality of images acquired by the image acquiring portion in order of pages of the booklet, and generates pairs from the arranged images, each of the pairs being a pair of pages adjacent to each other in a spread state of the booklet. The first determination portion determines whether or not a drawn image is present in a band-like region having a predetermined width and including a boundary portion between two images in each of the pairs generated by the pair generating portion. The second determination portion determines whether or not there is drawing continuity between the two images. The third determination portion determines whether or not the two images have to be combined to each other, on the basis of a determination result of the first determination portion and a determination result of the second determination portion. The image combining portion combines the two images, when the third determination portion determines that the two images have to be combined to each other.

An image processing method according to another aspect of the present invention includes a first step, a second step, a third step, a fourth step, a fifth step, and a sixth step. In the first step, an image for each of pages of a plurality of documents composing a booklet is acquired. In the second step, the images acquired in the first step are arranged in order of pages of the booklet, and pairs are generated from the arranged images, each of the pairs being a pair of pages adjacent to each other in a spread state of the booklet. In the third step, it is determined whether or not a drawn image is present in a band-like region having a predetermined width and including a boundary portion between two images in each of the pairs generated by the pair generating portion. In the fourth step, it is determined whether or not there is drawing continuity between the two images. In the fifth step, it is determined whether or not the two images have to be combined to each other, on the basis of a determination result in the third step and a determination result in the fourth step. In the sixth step, the two images are combined to each other, when it is determined in the fifth step that the two images have to be combined to each other.

Advantageous Effects of the Invention

According to the present invention, an image having satisfactory image quality can be generated from an image in each page acquired from a booklet.

BRIEF DESCRIPTION OF THE DRAWINGS

FIG. 4A is a view illustrating documents separated from each other by removal of staples of a saddle-stitched booklet.

FIG. 8 is a flowchart illustrating an image process executed by a control portion.

FIG. 9A is an explanatory view illustrating a booklet process according to a modification.

DESCRIPTION OF EMBODIMENT

An embodiment of the present invention will be described below with reference to the drawings. Note that the embodiment described below is only an example embodying the present invention, and does not limit the technical scope of the present invention.

Figure 1:
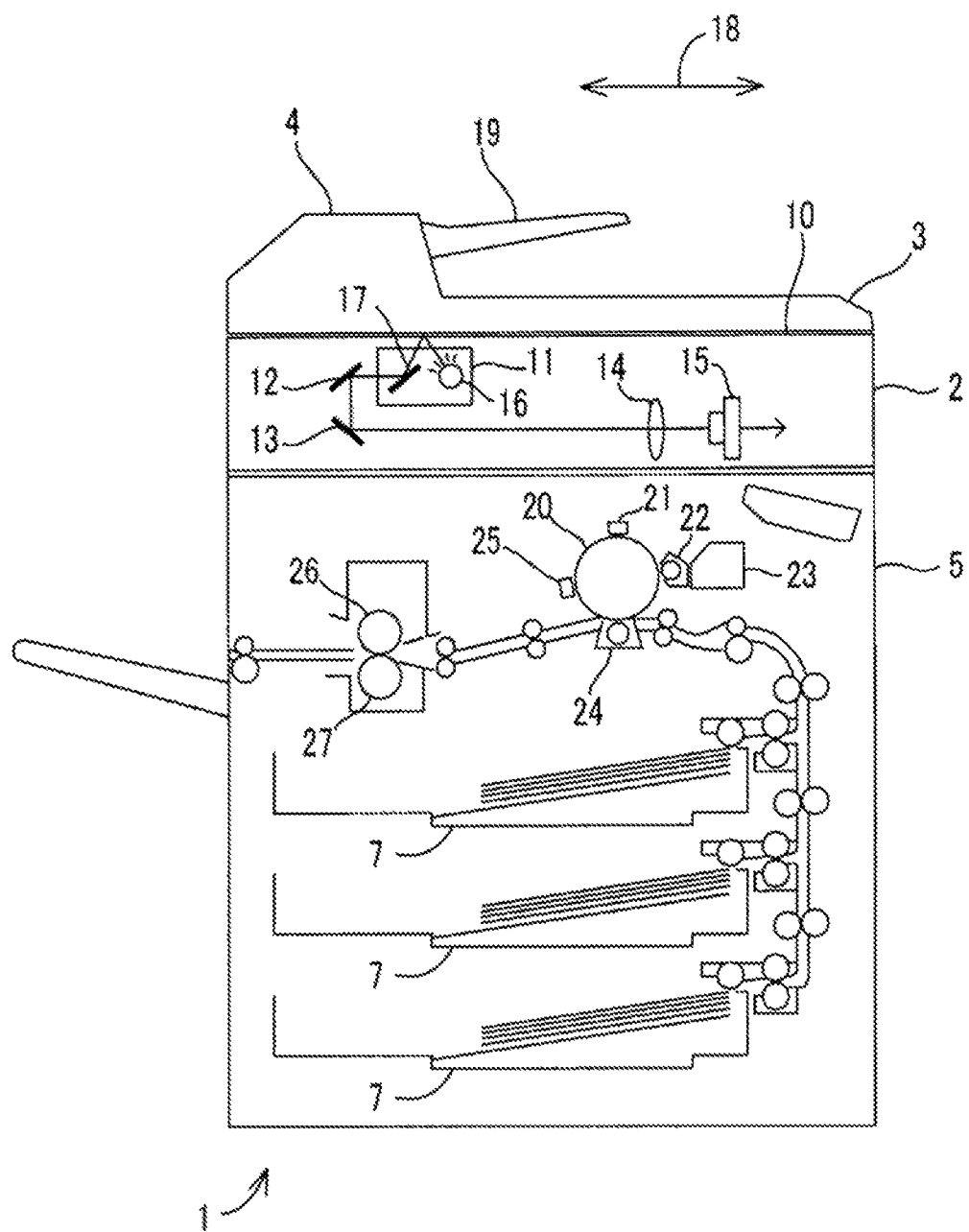
FIG. 1 is a schematic view illustrating an internal configuration of an image processing apparatus according to one embodiment of the present invention.

Firstly, a schematic configuration of an image processing apparatus 1 according to the embodiment of the present invention will be described with reference to FIGS. 1 and 2. The image processing apparatus 1 is a multifunction peripheral having an image reading function, a facsimile function, an image forming function, and the like. As illustrated in FIG. 1, the image processing apparatus 1 includes an image reading portion 2, a document cover 3, an auto document feeder (hereinafter referred to as an ADF) 4, an image forming portion 5, an operation display portion 6 (see FIG. 2), a sheet feed cassette 7, a communication interface (I/F) portion 8 (see FIG. 2), and a control portion 9 (see FIG. 2) controlling these components. Notably, while the image processing apparatus 1 that is a multifunction peripheral is described as one example of an image processing apparatus according to the present invention, the present invention is not limited thereto, and a printer, a facsimile device, a copying machine, or a scanner device also corresponds to the image processing apparatus according to the present invention.

The image reading portion 2 executes an image reading process for reading image data from a document. As illustrated in FIG. 1, the image reading portion 2 includes a contact glass 10, a reading unit 11, mirrors 12 and 13, an optical lens 14, a CCD (Charge Coupled Device) 15, and the like.

The reading unit 11 includes an LED light source 16 and a mirror 17, and is configured to be movable in a sub-scanning direction 18 (in the horizontal direction in FIG. 1) with a moving mechanism (not illustrated) using a drive motor such as a stepping motor or the like. When the reading unit 11 is moved in the sub-scanning direction 18 with the drive motor, light emitted from the LED light source 16 toward the contact glass 10 provided on the top surface of the image reading portion 2 scans in the sub-scanning direction 18.

When light is emitted from the LED light source 16, the mirror 17 reflects reflection light, which is reflected on the document or the back surface of the document cover 3, toward the mirror 12. The light reflected on the mirror 17 is guided to the optical lens 14 by the mirrors 12 and 13. The optical lens 14 condenses the incident light and causes the resultant light to be incident on the CCD 15.

The CCD 15 is a photoelectric conversion element that converts the received light into an electric signal (voltage) according to the quantity (intensity of brightness) of the received light and outputs the electric signal to the control portion 9. The control portion 9 performs an image process to the electric signal from the CCD 15 to generate image data of the document. It is to be noted that, although the present embodiment describes the example using the CCD 15 as an imaging element, a reading mechanism using a contact image sensor (CIS) having a focal length shorter than the CCD 15 can also be applied in place of the reading mechanism using the CCD 15.

The document cover 3 is pivotably mounted to the image reading portion 2. The contact glass 10 on the top surface of the image reading portion 2 is opened and closed by the document cover 3 being operated to pivot. A cover opening detection sensor (not illustrated) such as a limit switch is provided at a pivoting support portion of the document cover 3, and when a user opens the document cover 3 to cause an image of a document to be read, the cover opening detection sensor is activated, and a detection signal thereof (cover opening detection signal) is output to the control portion 9.

Reading of a document image by the image reading portion 2 is performed in the following procedure. Firstly, a document is placed on the contact glass 10, and then, the document cover 3 is brought into a closed state. When an image reading command is then input from an operation display portion 6, one line of light is sequentially continuously emitted from the LED light source 16, while the image reading unit 11 is moved to the right in the sub-scanning direction 18. Then, reflection light from the document or the back surface the document cover 3 is guided to the CCD 15 through the mirrors 17, 12, and 13 and the optical lens 14, whereby light amount data according to the quantity of light received by the CCD 15 is sequentially output to the control portion 9. When acquiring light amount data in the entire region irradiated with light, the control portion 9 processes the light amount data, thereby generating image data of the document from the light amount data. This image data constitutes a rectangular image.

Notably, the ADF 4 is mounted to the document cover 3. The ADF 4 conveys one or more documents set on a document set portion 19 one by one with a plurality of conveyance rollers, and moves the document to pass through an automatic document reading position, which is defined on the contact glass 10, to the right in the sub-scanning direction 18. When the document is moved by the ADF 4, the reading unit 11 is disposed below the automatic document reading position, and an image of the moving document is read by the reading unit 11 at this position. The document set portion 19 is provided with a mechanical document detection sensor (not illustrated) capable of outputting a contact signal. When a document is set on the document set portion 19, the document detection sensor described above is activated, and the detection signal thereof (document detection signal) is output to the control portion 9.

As illustrated in FIG. 1, the image forming portion 5 is an electrophotographic image forming portion that executes an image forming process (printing process) based on image data read by the image reading portion 2 or a print job input through the communication I/F portion 8 from an external information processing apparatus such as a personal computer. Specifically, the image forming portion 5 includes a photosensitive drum 20, a charging portion 21, a developing portion 22, a toner container 23, a transfer roller 24, an electricity removing portion 25, a fixing roller 26, a pressure roller 27, and the like. It is to be noted that, although the present embodiment describes an electrophotographic image forming portion 5 as one example, the image forming portion 5 is not limited to the electrophotographic type, and may be of an ink jet recording type, or other recording type or printing type.

Here, the image forming portion 5 executes the image forming process to a print sheet fed from the sheet feed cassette 7 in the following procedure. Firstly, when a print job including a print command is input through the communication I/F portion 8, the photosensitive drum 20 is uniformly charged to a predetermined potential with the charging portion 21. Next, the surface of the photosensitive drum 20 is irradiated with light based on image data included in the print job by a laser scanner unit (LSU, not illustrated). With this, an electrostatic latent image is formed on the surface of the photosensitive drum 20. The electrostatic latent image on the photosensitive drum 20 is then developed (made visible) as a toner image by the developing portion 22. Notably, toner (developer) is replenished from the toner container 23. Subsequently, the toner image formed on the photosensitive drum 20 is transferred onto a print sheet by the transfer roller 24. Thereafter, the toner image transferred onto the print sheet is heated by the fixing roller 26, and fused and fixed, when the print sheet passes between the fixing roller 26 and the pressure roller 27 and is discharged. Notably, the potential of the photosensitive drum 20 is removed by the electricity removing portion 25.

Figure 2:
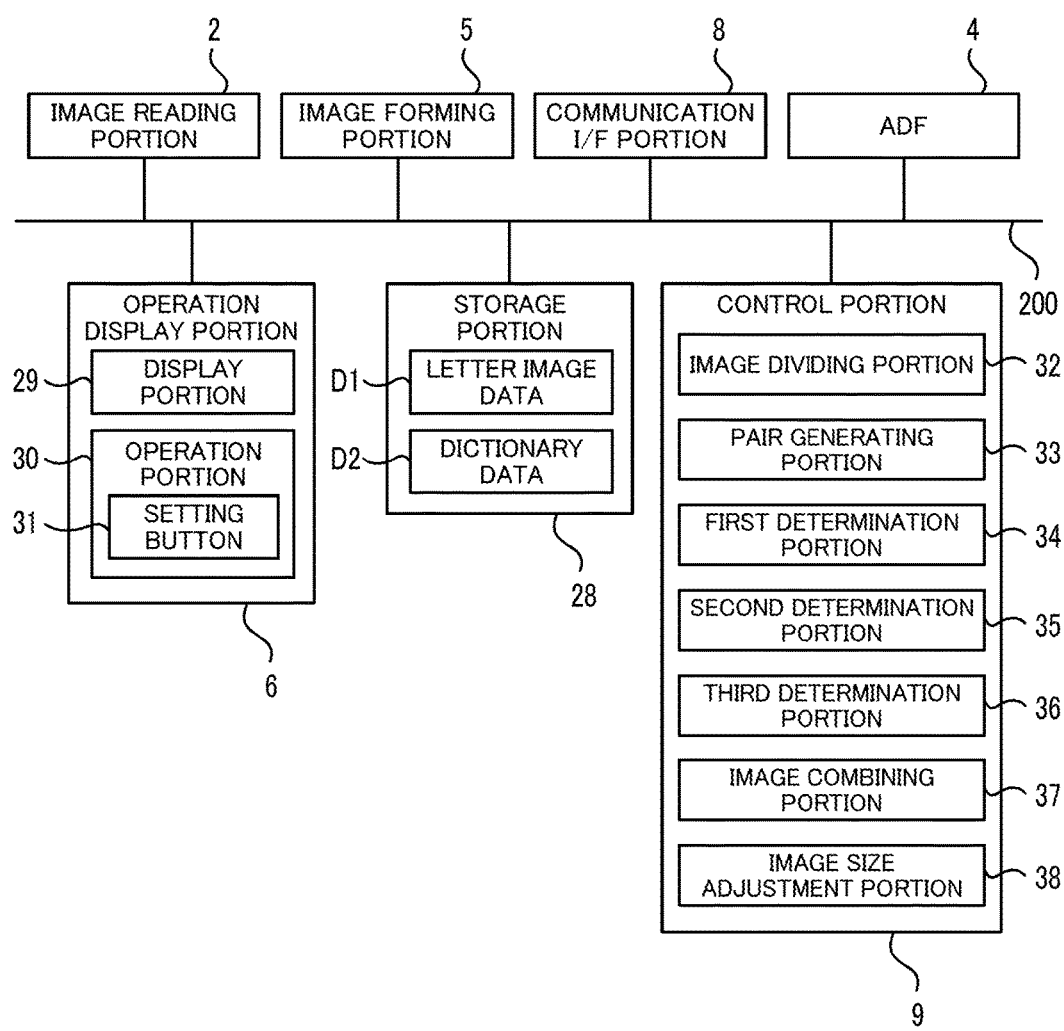
FIG. 2 is a block diagram illustrating one example of an electric configuration of the image processing apparatus.

With reference to FIG. 2, the communication I/F portion 8 is an interface that executes data communication with an external device connected to the image processing apparatus 1 through the Internet or a communication network such as LAN. A storage portion 28 is composed of a non-volatile memory such as a hard disk drive (HDD).

The storage portion 28 preliminarily stores image data D1 of various letters such as hiragana, katakana, and alphabets. The storage portion 28 also preliminarily stores dictionary data D2 collecting words (terms, texts, phrases) composed of letter strings of these various letters. The image data D1 and the dictionary data D2 are used for a later-described image dividing process.

The control portion 9 is configured to include a CPU (Central Processing Unit) and a memory having a ROM (Read Only Memory) and a RAM (Random Access Memory). The CPU is a processor executing various computation processes. The ROM is a non-volatile storage portion that preliminarily stores information such as a control program to cause the CPU to execute various processes. The RAM is a volatile storage portion, and is used as a temporal storage memory (work area) for various processes executed by the CPU. The control portion 9 controls the operation of each portion by executing a program stored in the ROM by the CPU.

The operation display portion 6 includes a display portion 29 and an operation portion 30. The display portion 29 is composed of a color liquid crystal display, for example, and displays various information sets to a user operating the operation display portion 29. The operation portion 30 includes various push button keys disposed to be adjacent to the display portion 29 and a touch panel sensor disposed on a display screen of the display portion 29, and various commands are input thereto by the user of the image processing apparatus 1. It is to be noted that, when the user performs an operation on the operation display portion 6 for performing the image reading operation or the image forming operation, the operation signal is output to the control portion 9 from the operation display portion 6.

In the image processing apparatus 1, respective components are connected through a data bus 200 in order that the image reading portion 2, the image forming portion 5, the operation display portion 6, the communication I/F portion 8, the storage portion 28, and the control portion 9 can mutually input and output data.

The image processing apparatus 1 according to the present embodiment has a booklet copying mode for performing a copying operation to a plurality of documents composing a booklet as a target to be read. The operation display portion 6 includes a setting button 31 (see FIG. 2) for setting the image processing apparatus 1 into the booklet copying mode. When the setting button 31 is operated, the image processing apparatus 1 is brought into the booklet copying mode.

Figure 3A:
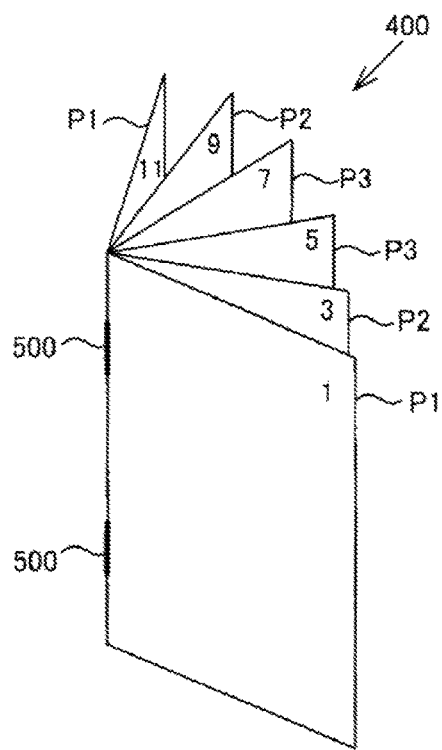
FIG. 3A is an explanatory view of a saddle-stitched booklet.
Figure 3B:
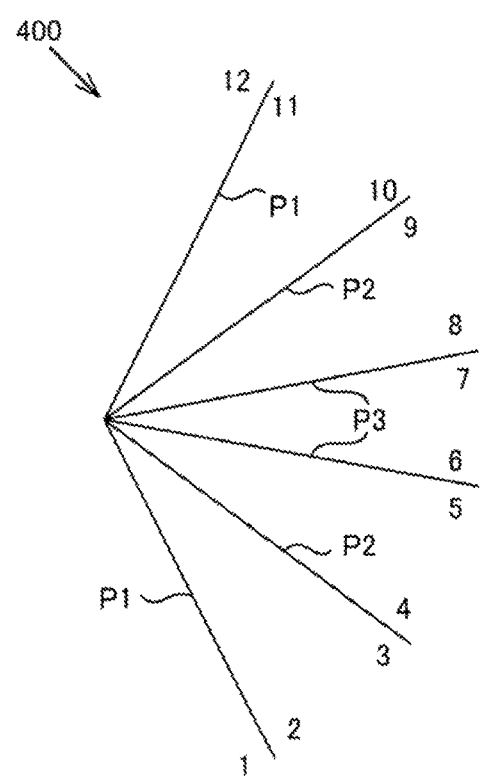
FIG. 3B is an explanatory view of a saddle-stitched booklet.

FIG. 3 illustrates one example of a booklet. A booklet S illustrated in FIG. 3 is a saddle-stitched booklet (hereinafter referred to as a saddle-stitched booklet 400) in which stacked document sheets are folded at a folding line at the center of the stacked document sheets in the direction of a long side with a plurality of staples 500 being inserted along the folding line. The saddle-stitched booklet 400 illustrated in FIG. 3 is composed of three documents P1 to P3 which are placed in order of P1, P2, and P3 from the outside. Images of the first page and the twelfth page are formed on a first surface of the document P1, and images of the second page and the eleventh page are formed on a second surface thereof. Images of the third page and the tenth page are formed on a first surface of the document P2 and images of the fourth page and the ninth page are formed on a second surface thereof. Images of the fifth page and the eighth page are formed on a first surface of the document P3, and images of the sixth page and the seventh page are formed on a second surface thereof.

Figure 4B:
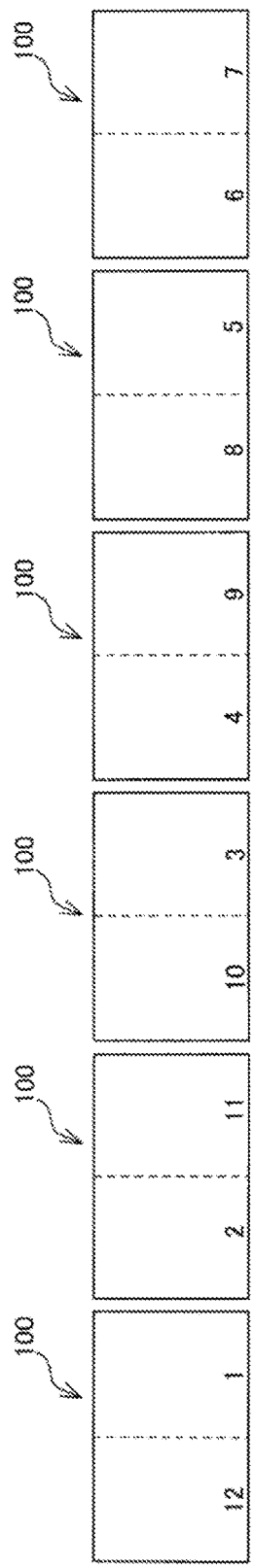
FIG. 4B is a view illustrating images (read images) read by an image reading portion.

With the image processing apparatus 1 according to the present embodiment, there may be a case in which, as illustrated in FIG. 4A, the documents composing the saddle-stitched booklet 400 are separated from each other by removal of the staples 500, and a copying command to copy these documents is issued in the booklet copying mode. Note that the numerals in FIGS. 3 and 4A to 4D indicate page numbers of the saddle-stitched booklet 400.

It is supposed that the image processing apparatus 1 executes copying of each document in this case. When the target to be read is the saddle-stitched booklet 400 illustrated in FIG. 3, read images 100 for six documents, each including images for two pages, are generated as illustrated in FIG. 4B. In this case, it is likely that there is continuity or relevancy of drawn images between images in two pages adjacent to each other in the horizontal direction in a spread state of the saddle-stitched booklet 400. However, regarding the images in the respective pages in the generated read images, the pages are out of order as illustrated in FIG. 4B. Therefore, when the images in the respective pages are printed on print surfaces of print sheets according to the reading order, the images are randomly arranged in a newly generated printed matter, so that a user cannot visually recognize drawn images having continuity or relevancy as an aggregate.

The image processing apparatus 1 according to the present embodiment has a booklet processing function for generating a printed matter in which, when there is continuity or relevancy between drawn images in two pages adjacent to each other in the horizontal direction in a spread state, these drawn images are neatly visually recognized as an aggregate. This aspect will be described below in detail. Notably, in the following description, images of documents separated from each other by removal of the staples 500 of the saddle-stitched booklet 400 are read by the image reading portion 2, and the read images are used as a target of the booklet process.

Regarding the booklet processing function, the control portion 9 includes an image dividing portion 32, a pair generating portion 33, a first determination portion 34, a second determination portion 35, a third determination portion 36, an image combining portion 37, and an image size adjustment portion 38 through execution of a program by the CPU. The image dividing portion 32 is one example of an image dividing portion and the pair generating portion 33 is one example of a pair generating portion. Further, the first determination portion 34 is one example of a first determination portion and the second determination portion 35 is one example of a second determination portion. The third determination portion 36 is one example of a third determination portion, the image combining portion 37 is one example of an image combining portion, and the image size adjustment portion 38 is one example of an image size adjustment portion.

Figure 4C:
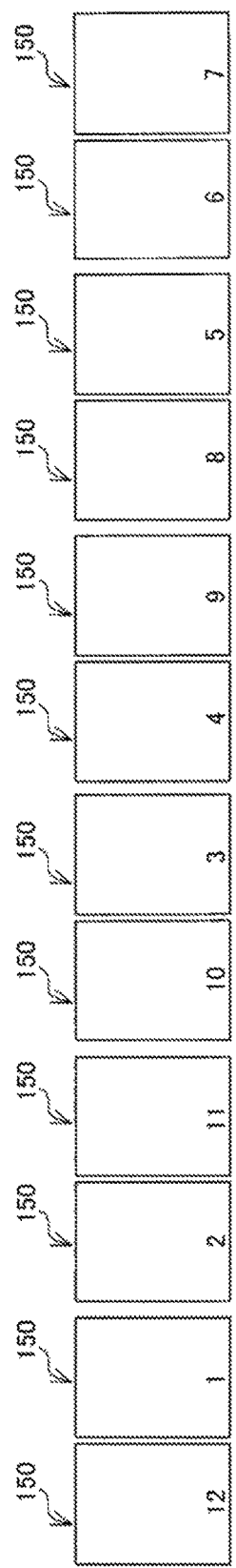
FIG. 4C is a view illustrating division images formed by dividing the read images illustrated in FIG. 4B.

The image dividing portion 32 works in the setting of the booklet copying mode. As illustrated in FIG. 4B, the image dividing portion 32 acquires the read images 100 acquired by the reading operation of the image reading portion 2 performed to the documents composing the saddle-stitched booklet 400, and divides each read image 100 at the center (the position of a dotted line illustrated in FIG. 4B) in the direction of the long side thereof. With this, as illustrated in FIG. 4C, the read images 100 are each divided into images in the respective pages of the saddle-stitched booklet 400. Each image after the division by the image dividing portion 32 is referred to as a division image 150. The image dividing portion 32 is one example of an image acquiring portion.

Figure 4D:
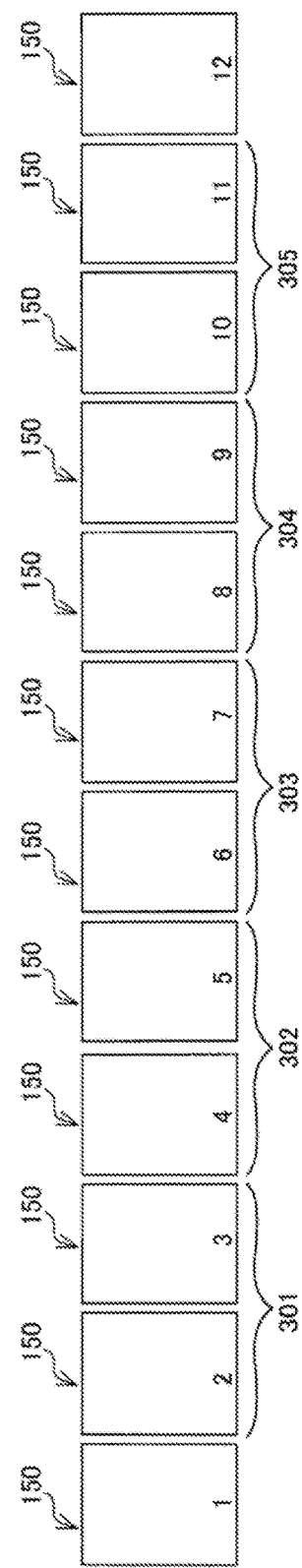
FIG. 4D is a view illustrating a state in which the division images illustrated in FIG. 4C are rearranged in order of pages.

The pair generating portion 33 arranges the division images 150 in order of the pages of the saddle-stitched booklet 400. Specifically, the pair generating portion 33 detects a page number included in each division image 150 with a letter identification function using letter image data D1 stored in the storage portion 28, and arranges the division images 150 in the order of the pages based on the detected page numbers. In FIG. 4D, the division images 150 corresponding to the first page to the twelfth page are arranged in ascending order from the left.

Then, the pair generating portion 33 generates pairs from the arranged division images 150, each of the pairs being a pair of pages adjacent to each other in a spread state of the saddle-stitched booklet 400. It is to be noted that, in the present embodiment, the pair generating portion 33 excludes the first page corresponding to the cover sheet and the twelfth page corresponding to the back cover of the saddle-stitched booklet 400 from the target of pair generation. FIG. 4D illustrates that pairs 301 to 305 are generated as a result of generating pairs for the second page to the eleventh page except for the first page corresponding to the cover sheet and the twelfth page corresponding to the back cover of the saddle-stitched booklet 400.

Figure 5:
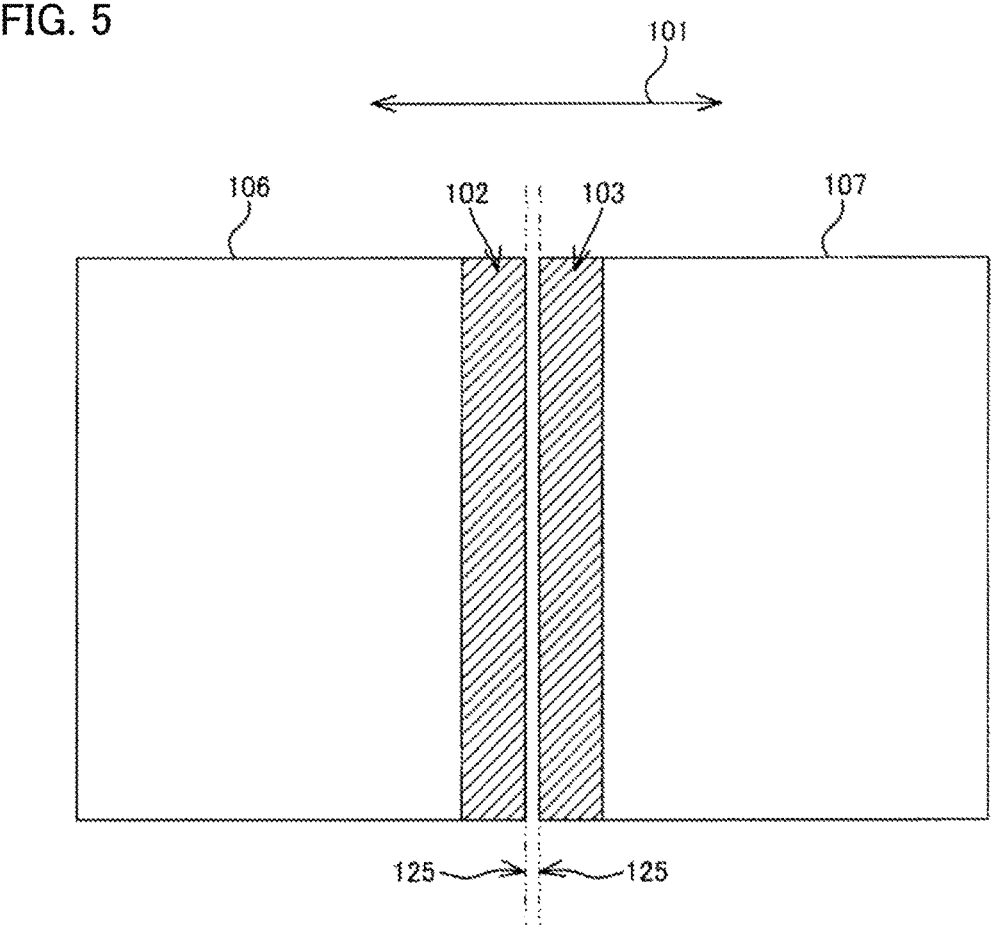
FIG. 5 is an explanatory view of a band-like region.

As illustrated in FIG. 5, for each of the pairs 301 to 305 of the division images 150, the first determination portion 34 sets, as a target to be subjected to the following processing, band-like regions 102 and 103 (hatched regions), each having a predetermined width and including a division end 125, of the two division images 150 which are set as a pair. Notably, in FIG. 5, in order to distinguish the two division images 150 set as a pair from each other, one of the two division images 150 is indicated as a division image 106 while the other is indicated as a division image 107. The division end is one example of a boundary portion.

The first determination portion 34 determines whether or not a drawn image is present in the band-like regions 102 and 103. The drawn image means an image of a line or an image of a letter, for example. The first determination portion 34 determines that a drawn image is present when a predetermined number or more of pixels having a pixel value equal to or lower than a predetermined value (density equal to or higher than a certain value) are present in the band-like regions 102 and 103.

Figure 6A:
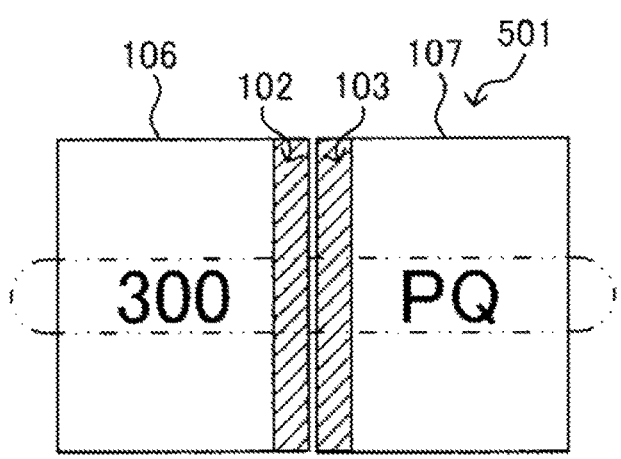
FIG. 6A is a view illustrating one example of two division images set as a pair.
Figure 6B:
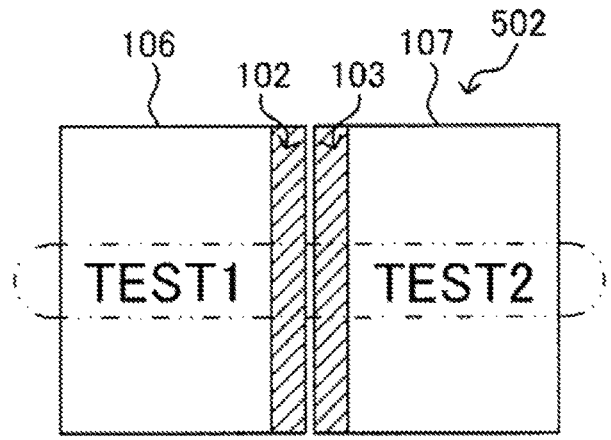
FIG. 6B is a view illustrating one example of two division images set as a pair.
Figure 6C:
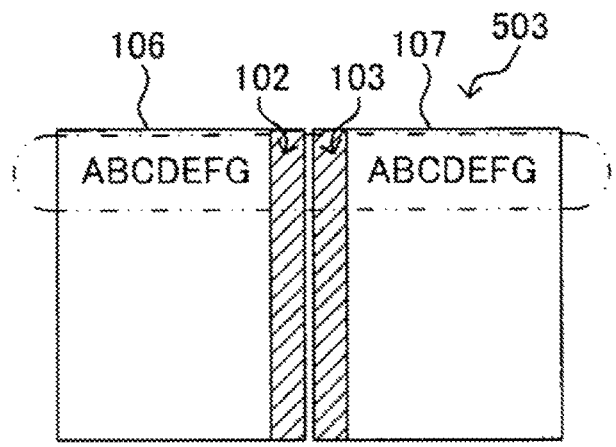
FIG. 6C is a view illustrating one example of two division images set as a pair.
Figure 6D:
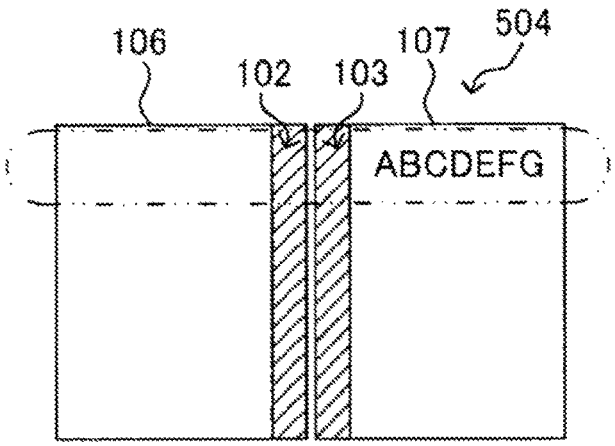
FIG. 6D is a view illustrating one example of two division images set as a pair.
Figure 6E:
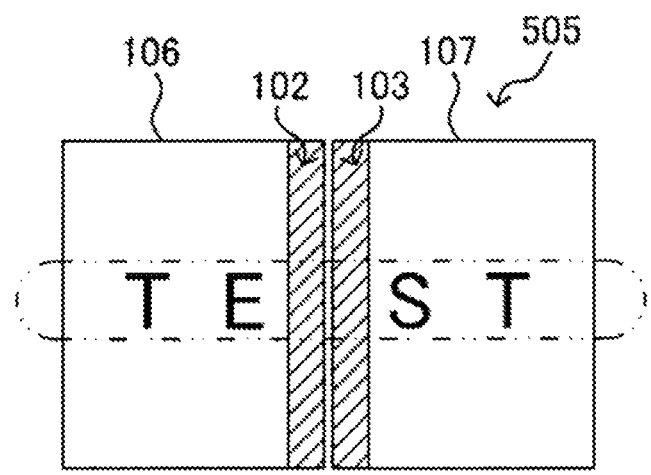
FIG. 6E is a view illustrating one example of two division images set as a pair.
Figure 6F:
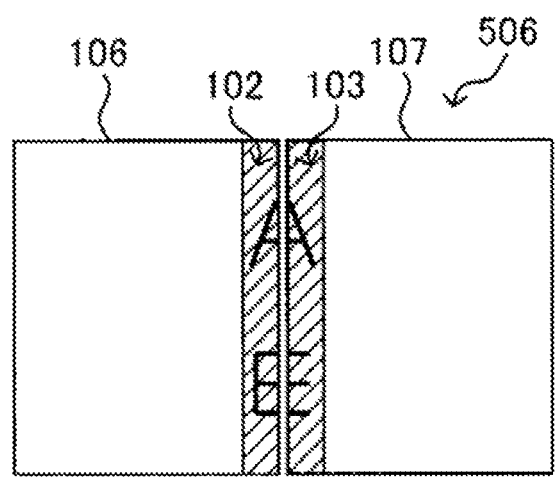
FIG. 6F is a view illustrating one example of two division images set as a pair.
Figure 6G:
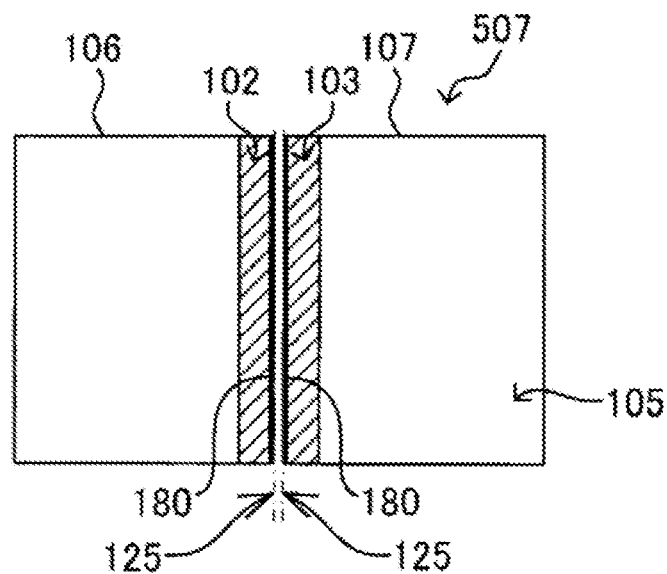
FIG. 6G is a view illustrating one example of two division images set as a pair.
Figure 6H:
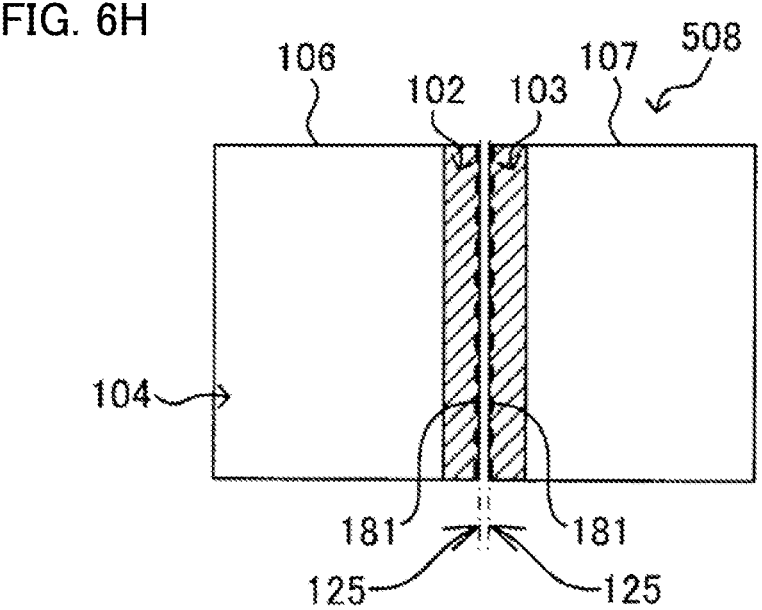
FIG. 6H is a view illustrating one example of two division images set as a pair.

Examples of the two division images 106 and 107 set as a pair are illustrated in FIGS. 6A to 6H. FIGS. 6A to 6E illustrate examples of pairs 501 to 505 of two division images 106 and 107 in which a drawn image is not present in the band-like regions 102 and 103. FIGS. 6F to 6H illustrate examples of pairs 506 to 508 of two division images 106 and 107 in which a drawn image is present in the band-like regions 102 and 103.

In the case where the pair of two division images 106 and 107 is any of the pairs 501 to 505 illustrated in FIGS. 6A to 6E, the first determination portion 34 determines that a drawn image is not present in the band-like regions 102 and 103, based on that image data in the band-like regions 102 and 103 is uniform white data. In the case where the pair of two division images 106 and 107 is any of the pairs 506 to 508 illustrated in FIGS. 6F to 6H, the first determination portion 34 determines that a drawn image is present in the band-like regions 102 and 103, based on that image data in the band-like regions 102 and 103 varies at different parts.

When determining that drawn images are present in the band-like regions 102 and 103, the first determination portion 34 determines whether or not the drawn images are boundary lines between division images 106 and 107. Each boundary line is one example of a boundary image, and is a solid line or a dotted line, for example. FIGS. 6G and 6H illustrate the pairs 507 and 508 of the two division images 106 and 107 in which the drawn images in the band-like regions 102 and 103 are boundary lines 180 and 181. In the case where the boundary lines 180 and 181 pass through a center point of each of a pair of long sides 101 of the read image 100 read by the image reading portion 2, for example, the boundary lines 180 and 181 are present along the division ends 125 of the division images 106 and 107 as illustrated in FIGS. 6G and 6H. When pixels having a pixel value equal to or lower than a predetermined value are continuously arrayed in a linear fashion, these pixels constitute a straight line. Further, when pixel arrays of a plurality of pixels having a pixel value equal to or lower than a predetermined value are linearly arrayed with a space, these pixels constitute a dotted line. In the case where pixels having a pixel value equal to or lower than a predetermined value are arrayed in the above fashion along the division ends 125 in the band-like regions 102 and 103, the first determination portion 34 determines that the drawn images in the band-like regions 102 and 103 are boundary lines between the images in the image regions 104 and 105.

In the pair 506 illustrated in FIG. 6F, drawn images in the band-like regions 102 and 103 are not an image of a boundary line but images of alphabet letters "A" and "E".

In the case where the pair of the two division images 106 and 107 is the pair 506 illustrated in FIG. 6F, the first determination portion 34 determines that the drawn images in the band-like regions 102 and 103 are not images of boundary lines. In the case where the pair of the two division images is either of the pairs 507 and 508 illustrated in FIGS. 6G and 6H, the first determination portion 34 determines that the drawn images in the band-like regions 102 and 103 are the boundary lines.

The second determination portion 35 determines whether or not drawn images of letters in the division images 106 and 107 have drawing continuity. The drawing continuity means in the present embodiment that the drawn images of letters in the respective division images 106 and 107 indicate successive letters (a string of letters) composing one word or one phrase (phrase, paragraph).

The process of the second determination portion 35 will be specifically described. Firstly, the second determination portion 35 determines whether or not a drawn image is present in each of the division images 106 and 107. When determining that a drawn image is present in each of the division images 106 and 107, the second determination portion 35 detects whether or not the drawn image indicates a letter, and when the drawn image indicates a letter, the second determination portion 35 detects which letter is indicated. As described above, the storage portion 28 preliminarily stores the letter image data D1 (see FIG. 2) of various letters such as hiragana. The second determination portion 35 performs the above letter detection by comparing the detected drawn image with the letter image data D1.

When detecting drawn images of letters in the division images 106 and 107, the second determination portion 35 determines whether or not there is drawing continuity between the drawn images of the letters in the image regions 104 and 105. That is, the second determination portion 35 determines whether or not the drawn images of the letters in the division images 106 and 107 are images indicating successive letters (a string of letters) composing one word. As described above, the storage portion 28 preliminarily stores the dictionary data D2 (see FIG. 2), and the second determination portion 35 performs the above word detection by comparing the letter string with the dictionary data D2. In the case where the detected letter string is registered as a word in the dictionary data, the second determination portion 35 determines that there is drawing continuity between the drawn images of the letters in the division images 106 and 107. On the other hand, in the case where the detected letter string is not registered in the dictionary data as a word, the second determination portion 35 determines that there is no drawing continuity.

In the pair 501 illustrated in FIG. 6A, numeral "300" is formed in the left division image 106, and letters "PQ" are formed in the right division image 107. Here, a string of letters composed of succession of the numeral "300" and the letters "PQ" does not constitute one word or phrase. Therefore, the second determination portion 35 determines that the pair 501 illustrated in FIG. 6A does not have drawing continuity.

In the pair 502 illustrated in FIG. 6B, letters "TEST1" are formed in the left division image 106, and letters "TEST2" are formed in the right division image 107. Here, a string of letters composed of succession of the letters "TEST1," and the letters "TEST2" does not constitute one word or phrase. Therefore, the second determination portion 35 determines that the pair 501 illustrated in FIG. 6B does not have drawing continuity.

In the pair 503 illustrated in FIG. 6C, letters "ABCDEFG" are formed in both the left division image 106 and the right division image 107. A case where a company's name, for example, is formed by default setting is conceivable as the above-described case where the same strings of letters are formed in both the left division image 106 and the right division image 107. In the case of the pair 503 illustrated in FIG. 6C, a string of letters composed of succession of the two sets of letters "ABCDEFG" does not constitute one word or phrase. Therefore, the second determination portion 35 determines that the pair 503 illustrated in FIG. 6C does not have drawing continuity.

In the pair 504 illustrated in FIG. 6D, letters "ABCDEFG" are formed only in the right division image 107, and nothing is drawn in the left division image 108. In the case where one of the regions does not have a drawn image, the second determination portion 35 determines that this pair does not have drawing continuity.

In the pair 505 illustrated in FIG. 6E, letters "TE" are formed in the left division image 106, and letters "ST" are formed in the right division image 107. A string of letters composed of succession of the letters "TE" and the letters "ST" constitutes one word "TEST". Therefore, the second determination portion 35 determines that the pair 505 illustrated in FIG. 6E has drawing continuity.

The third determination portion 36 determines whether or not the two division images 106 and 107 in this pair should be combined to each other, based on the detection result of the first determination portion 34 and the determination result of the second determination portion 35.

Specifically, the third determination portion 36 determines that the two division images 106 and 107 do not have to be combined to each other, in the case where it is not determined by the first determination portion 34 that drawn images are present in the band-like regions 102 and 103 and it is determined by the second determination portion 35 that there is no drawing continuity between the drawn images of the letters in the division images 106 and 107. Accordingly, in the case where the pair of two division images 106 and 107 is either of the pairs 501 to 504 illustrated in FIGS. 6A to 6D, the third determination portion 36 determines that the two division images 106 and 107 in each of the pairs 501 to 504 do not have to be combined to each other.

On the other hand, in the case where it is determined by the first determination portion 34 that drawn images are not present in the band-like regions 102 and 103 and it is determined by the second determination portion 35 that there is drawing continuity between the drawn images of the letters in the division images 106 and 107, the third determination portion 36 determines that the two division images 106 and 107 in this pair have to be combined to each other. Accordingly, in the case where the pair of the two division images 106 and 107 is the pair 505 illustrated in FIG. 6E, the third determination portion 36 determines that the two division images 106 and 107 in this pair 505 have to be combined to each other.

In addition, in the case where the images of the boundary lines are detected in the band-like regions 102 and 103 by the first determination portion 34, the third determination portion 36 determines that the two division images 106 and 107 do not have to be combined to each other, regardless of the determination result of the second determination portion 35. Accordingly, in the case where the pair of two division images 106 and 107 is either of the pairs 507 and 508 illustrated in FIGS. 6G and 6H, the third determination portion 36 determines that the two division images 106 and 107 in each of these pairs 507 and 508 do not have to be combined to each other.

Further, in the case where images other than the boundary line are detected in the band-like regions 102 and 103 by the first determination portion 34, the third determination portion 36 determines that the two division images 106 and 107 have to be combined to each other. Accordingly, in the case where the pair of two division images 106 and 107 is the acquired image 506 illustrated in FIG. 6F, the third determination portion 36 determines that that the two division images 106 and 107 in this pair 506 have to be combined to each other.

Figure 7:
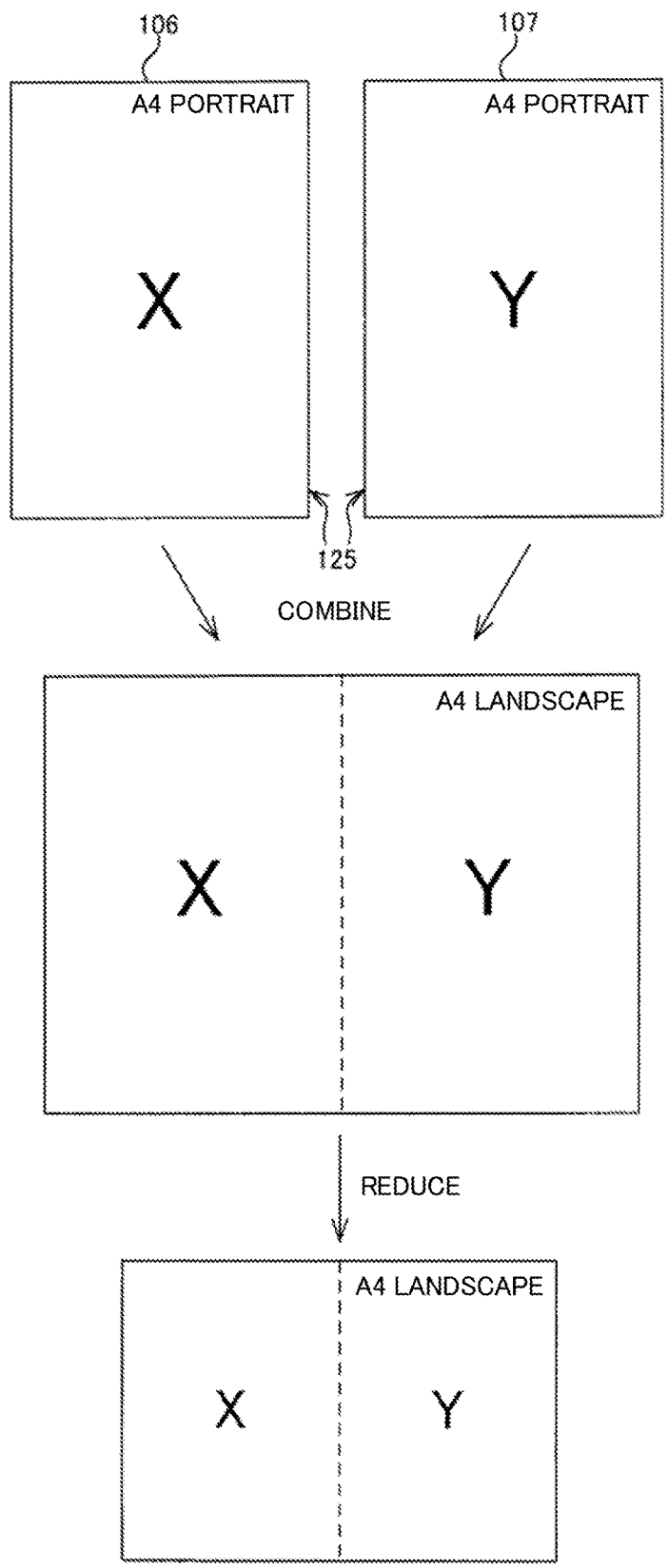
FIG. 7 is an explanatory view of an image size adjustment process to an image combined.

The image combining portion 37 performs image combination for the division images 106 and 107, which are determined to be combined to each other by the third determination portion 36, in the pair as illustrated in an upper stage and a middle stage in FIG. 7. As for the pairs 501 to 508 illustrated in FIGS. 6A to 6H, the image combining portion 37 combines the two division images 106 and 107 in the pairs 505 and 506 illustrated in FIGS. 6E and 6F which are determined that the image combination should be performed. The image combining portion 37 combines the two division images 106 and 107 in the pairs 505 and 506 at the division ends 125. When combining the division images 106 and 107, the image combining portion 37 performs image processing such as position alignment and/or density regulation between the drawn image in the division image 106 and the drawn image in the division image 107. The image combining portion 37 outputs the combined image thus combined to the image size adjustment portion 38.

The image size adjustment portion 38 performs size adjustment for adjusting the image size of the combined image obtained by the image combining portion 37 to the image size of the image which is not combined. In the present embodiment, the image size adjustment portion 38 adjusts the image size of the combined image to the image size of the image which is not combined. For example, in the case where each of the division images 106 and 107, which are combined to each other, is an image having A4 size, the combined image becomes to have A3 size as illustrated in the middle stage and the lower stage in FIG. 7. The image size adjustment portion 38 performs a process of reducing the combined image of A3 size to A4 size of landscape orientation which is the image size of the image which is not combined.

Next, the booklet process by the control portion 9 will be described. FIG. 8 is a flowchart illustrating the booklet process executed by the control portion 9. When a copy command is issued in the state in which a document is set on the document set portion 19 and the booklet copying mode is set, the control portion 9 executes the booklet process. Note that steps S1, S2 . . . , represent the process procedure (step) numbers in the flowchart illustrated in FIG. 8.

When a copying command is issued by a user (YES in step S1) in the booklet copying mode, the image reading portion 2 reads an image of the document (step S2). The image dividing portion 32 divides each read image 100 acquired by the reading operation at the center in the direction of the long side thereof (step S3). With this, each read image 100 is divided into images of the respective pages of the saddle-stitched booklet 400, whereby the division images 150 (106 and 107) are generated.

The pair generating portion 33 performs a process of generating a pair of the division images 106 and 107 (step S4). Specifically, the pair generating portion 33 firstly arranges the division images 106 and 107 in order of pages of the saddle-stitched booklet 400. The pair generating portion 33 also detects a page number included in each of the division images 106 and 107 with the letter identification function using the letter image data D1 stored in the storage portion 28. The pair generating portion 33 arranges the division images 106 and 107 in order of pages based on the detected page numbers. Then, the pair generating portion 33 generates pairs from the arranged division images 106 and 107, each of the pairs being a pair of pages adjacent to each other in the spread state of the saddle-stitched booklet 400. Notably, the pair generating portion 33 applies a pair number for each pair.

Next, the control portion 9 sets, as a processing target, the pair having the pair number "1" (step S5). The first determination portion 34 determines whether or not drawn images are present in the band-like regions 102 and 103 of the two division images 106 and 107 in this pair (step S6).

When the first determination portion 34 consequently determines that drawn images are not present in the band-like regions 102 and 103 (NO in step S6), the second determination portion 35 performs a process for detecting drawn images of letters in the division images 106 and 107 (step S7). When detecting that drawn images of letters are present in the division images 106 and 107, the second determination portion 35 determines whether or not a letter string composed of succession of these letters constitutes one word, that is, whether or not there is drawing continuity (step S8).

In the case where it is determined by the second determination portion 35 that there is drawing continuity in step S8 (NO in step S8), the third determination portion 36 determines that the two division images 106 and 107 in this pair have to be combined to each other, based on the series of determinations (step S9). The image combining portion 37 combines the two division images 106 and 107, based on the determination result of the third determination portion 36 (step S10), and the control portion 9 proceeds to the process in step S12.

It is to be noted that, when the second determination portion 35 determines that there is no drawing continuity in step S8 (YES in step S8), the control portion 9 proceeds to the process in step S12 without performing the processes in steps S9 and S10.

Further, when determining that a drawn images are present in the band-like regions 102 and 103 in step S6 (YES in step S6), the first determination portion 34 determines whether or not the drawn images are the images of the boundary lines (step S11). When the first determination portion 34 consequently determines that the drawn images are not the images of the boundary lines (NO in step S11), the control portion 9 proceeds to a process in step S9. Further, when the first determination portion 34 determines that the drawn images are the images of the boundary lines (YES in step S11), the control portion 9 proceeds to a process in step S12.

In step S12, the control portion 9 determines whether or not the processes in steps S6 to S11 are completed for all pairs. When determining that the processes in steps S6 to S11 are not completed for all pairs (NO in step S11), the control portion 9 sets, as a processing target, a pair with the pair number incremented by 1 (step S13), and performs the processes in steps S6 to S11 for this pair.

On the other hand, when the control portion 9 determines that the processes in steps S6 to S11 are completed for all pairs (YES in step S12), the image size adjustment portion 38 performs the size adjustment for adjusting the image size of the combined image obtained by the image combining portion 37 to the image size of the image which is not combined (step S14). Then, the control portion 9 outputs these images to the image forming portion 5 (step S15). The image forming portion 5 prints these images onto a sheet having a size suitable for the image size of the image not combined. The image forming portion 5 prints each image onto each print surface of a print sheet. Notably, the printing mode in this case may be one-side printing or duplex printing.

As described above, the image processing apparatus 1 according to the present embodiment divides each image read by the image reading portion 2 at a center in the direction of a long side thereof. The image processing apparatus 1 also generates pairs by rearranging the division images 106 and 107 in order of pages. The image processing apparatus 1 also determines whether or not drawn images are present in the band-like regions 102 and 103 of the two division images 106 and 107 in each pair. The image processing apparatus 1 also determines whether or not there is continuity or relevancy between the drawn images in the division images 106 and 107. Then, the image processing apparatus 1 determines whether or not the two division images 106 and 107 have to be combined to each other according to the determination results.

Specifically, when there is drawing continuity between the division images 106 and 107, the image processing apparatus 1 combines these two division images 106 and 107 even if drawn images are not present in the band-like regions 102 and 103. With this, these two division images 106 and 107 are arranged in the horizontal direction on one print surface of a single sheet, when these images are printed by one-side printing or duplex printing as described above. Thus, the user can visually recognize the drawn images having drawing continuity as an aggregate. In addition, an image having satisfactory image quality can be generated, compared to the case where the division images 106 and 107 are treated as individual images.

Particularly in the present embodiment, two division images 106 and 107 are combined after performing the image processing such as position alignment or density regulation between the drawn image in the division image 106 and the drawn image in the division image 107. Accordingly, an image having more satisfactory image quality can be generated.

In addition, in the image processing apparatus 1 according to the present embodiment, when drawn images are present in the band-like regions 102 and 103, the two division images 106 and 107 are combined even if the drawn images are images other than the boundary lines. With this configuration as well, an image having satisfactory image quality can be generated from a document image including drawn images for two pages of the saddle-stitched booklet 400.

In addition, in the present embodiment, the image size of a combined image can be adjusted to the image size of an image not combined. With this, when a designated print sheet has a size corresponding to the image size of an image not combined, the combined image obtained by the image combining portion 37 can be printed and output according to the sheet having this size.

While the preferable embodiment of the present invention has been described above, the present invention is not limited to the one described above, and various modifications are possible.

The embodiment described above indicates the process of copying documents, which are separated from each other by removal of the staples 500 of the saddle-stitched booklet 400, to create printed matters for creating a side-stitched booklet. However, the effect similar to the above effect can also be obtained by performing the similar process, in the case where documents are copied in the spread state without removing the staples 500.

Figure 9B:
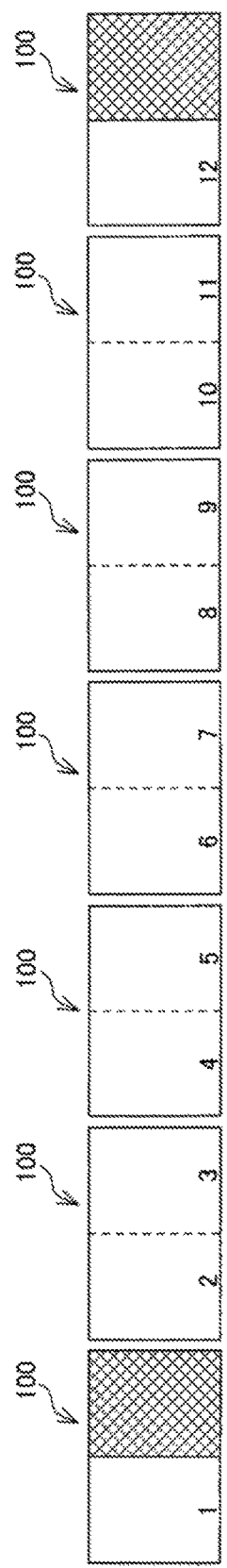
FIG. 9B is an explanatory view illustrating a booklet process according to a modification.

In the case where the saddle-stitched booklet 400 in the spread state is copied, the first page serving as a cover sheet and the twelfth page serving as a back cover are individually read in many cases. In this case, read images 100 for seven documents, each including images for two pages, are generated as illustrated in FIG. 9B. The half of each of the read images 100 formed by reading the first page and the twelfth page becomes a solid image. The shaded hatched region in FIG. 9B indicates the solid image.

Figure 9C:
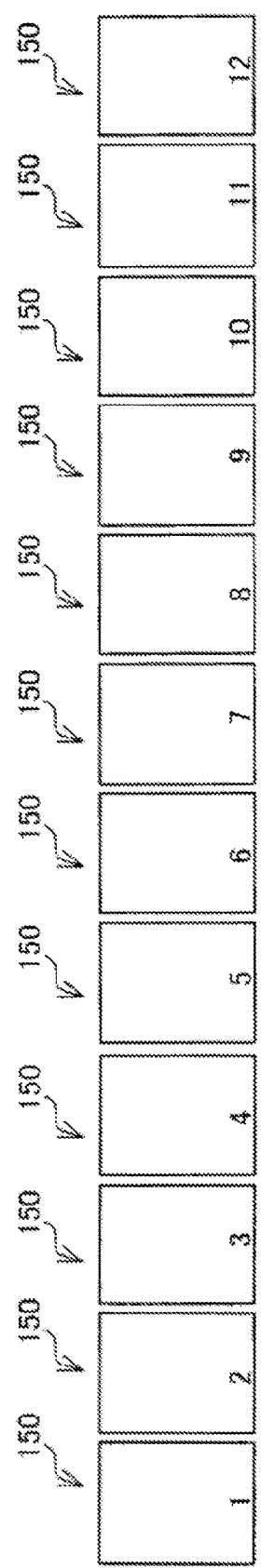
FIG. 9C is an explanatory view illustrating a booklet process according to a modification.
Figure 9D:
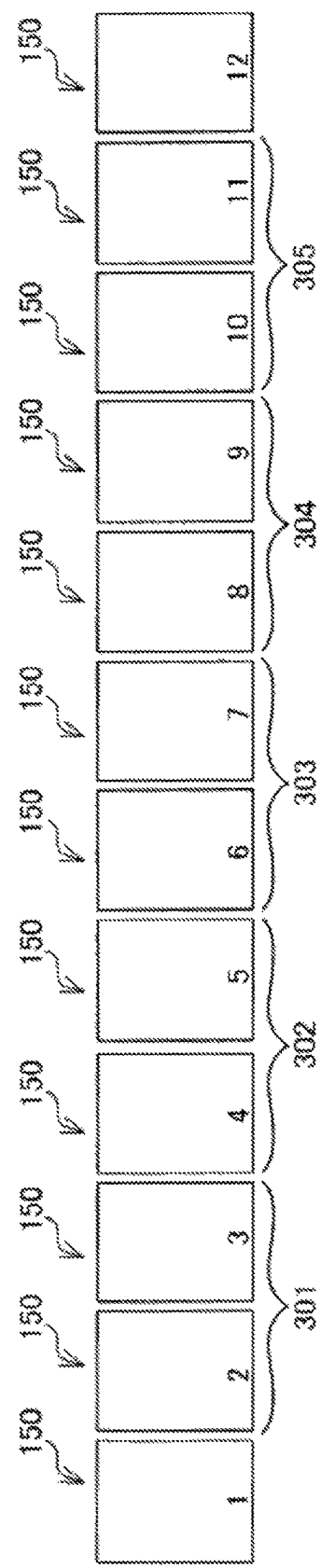
FIG. 9D is an explanatory view illustrating a booklet process according to a modification.

As illustrated in FIG. 9B, the image dividing portion 32 divides each of the read images 100, which are obtained by the reading operation of the image reading portion 2 to the documents composing the saddle-stitched booklet 400, at the center (the position of a dotted line illustrated in FIG. 9B) in the direction of the long side. With this, as illustrated in FIG. 9C, each read image 100 is divided into images of the respective pages of the saddle-stitched booklet 400, whereby division images 150 are generated. Then, the division images 150 are arranged in order of the pages of the saddle-stitched booklet 400. Note that the solid division image 150 described above is deleted.

Then, as illustrated in FIG. 4D, the pair generating portion 33 generates pairs from the arranged division images 150, each of the pairs being a pair of pages adjacent to each other in the spread state of the saddle-stitched booklet 400. It is to be noted that, also in the present embodiment, the pair generating portion 33 excludes the first page corresponding to the cover sheet and the twelfth page corresponding to the back cover of the saddle-stitched booklet 400, from the target of pair generation. FIG. 4D illustrates that pairs 301 to 305 are generated as a result of generating, by the pair generating portion 33, pairs for the second page to the eleventh page except for the first page corresponding to the cover sheet and the twelfth page corresponding to the back cover of the saddle-stitched booklet 400. Thereafter, the process similar to the process in the first embodiment may be executed.

The booklet that is the processing target in the present embodiment includes not only a saddle-stitched booklet but also a so-called side-stitched booklet in which a plurality of documents having images for one page on one surface or both surfaces are bound at the left side or at the upper side. In the case where these booklets are copied in the spread states without removing staples, a series of the booklet processes including the dividing process illustrated in FIGS. 9A to 9D are performed, whereby the effect similar to the above effect can be obtained.

On the other hand, in the case where documents which are separated from each other by removal of the staples 500 of the side-stitched booklet are copied, images are read page by page, so that one read image includes only an image for one page. Therefore, the dividing process need not be performed. Accordingly, when images are read in order of pages, the read images may be defined as a target of generating a pair, and thereafter, the process similar to the first embodiment may be executed.

In the embodiment described above, an image read by the image reading portion 2 is defined as a target image of the booklet process. However, the present invention is not limited thereto, and an image received from another device may be defined as a target of the booklet process. In the case where the received image is a document image including drawn images for two pages of the saddle-stitched booklet or the side-stitched booklet, this document image has to be divided as described above. In this case, the image dividing portion 32 is provided in the control portion 9 in the image processing apparatus 1. Alternatively, in the case where the received image is a division image described above, the image dividing portion 32 need not be provided, and the communication interface portion 8 functions as an image acquiring portion.

In addition, in the embodiment described above, an image which has been subjected to the booklet process is used to be printed and output. However, the image is not limited to be used as described above. For example, the image may be used to be transmitted to other devices, or may be used to be stored in this apparatus (image processing apparatus 1).

Further, in the embodiment described above, the image size of a combined image obtained by the image combining portion 37 is adjusted to the image size of an image not combined. However, the image size of an image not combined may be adjusted to the image size of a combined image obtained by the image combining portion 37. Notably, such image size adjustment is not essential in the present invention, and size adjustment may not be performed.

The invention claimed is:

1. An image processing apparatus comprising:
   an image acquiring portion configured to acquire an image for each page of a plurality of documents composing a booklet;
   a pair generating portion configured to arrange a plurality of images acquired by the image acquiring portion in order of pages of the booklet, and to generate pairs from the arranged images, each of the pairs being a pair of pages adjacent to each other in a spread state of the booklet;
   a first determination portion configured to determine whether or not a drawn image is present in a region having a predetermined width and including a boundary portion between two images in each of the pairs generated by the pair generating portion;
   a second determination portion configured to determine whether or not the two images are drawn images of letters, and when determining that the two images are drawn images of letters, determine whether or not the two images show, by successive letters of the two images, a string of letters that compose one word, then when determining that the two images show a string of letters that compose one word, determine that there is drawing continuity of the drawn images of letters between the two images, and when determining that the two images do not show a string of letters that compose one word, determine that there is no drawing continuity of drawn images of letters between the two images;
   a third determination portion configured to determine whether or not the two images have to be combined to each other, based on a determination result of the first determination portion and a determination result of the second determination portion; and
   an image combining portion configured to combine the two images, when the third determination portion determines that the two images have to be combined to each other, wherein
   the third determination portion determines that the two images have to be combined to each other, when it is determined by the first determination portion that a drawn image is not present in the region and it is determined by the second determination portion that there is the drawing continuity of drawn images of letters between the two images, and
   the third determination portion determines that the two images do not have to be combined to each other, when it is determined by the first determination portion that a drawn image is not present in the region and it is determined by the second determination portion that there is no drawing continuity of drawn images of letters between the two images.

2. The image processing apparatus according to claim 1, wherein the third determination portion determines that the two images have to be combined to each other regardless of the determination result of the second determination portion, when it is determined by the first determination portion that a drawn image is present in the region and it is determined by the first determination portion that the drawn image is an image other than a boundary image indicating a boundary between the two images.

3. The image processing apparatus according to claim 1, further comprising an image size adjustment portion configured to adjust an image size of a combined image obtained by the image combining portion to be same as an image size of an image which is not combined by the image combining portion.

4. The image processing apparatus according to claim 1, wherein the booklet is a saddle-stitched booklet formed by binding a plurality of documents folded in half in a stacked state at a folding line or in a vicinity thereof,
   the image acquiring portion is an image dividing portion configured to divide an image, which is formed by reading each of a plurality of documents separated from each other by releasing a binding state of the saddle-stitched booklet and includes drawn images for two pages of the saddle-stitched booklet, into images for the respective pages of the saddle-stitched booklet, thereby to acquire the image for each page, and the pair generating portion specifies each of division images obtained by the image dividing portion as a target of generating a pair.

5. The image processing apparatus according to claim 1, wherein the booklet is a saddle-stitched booklet formed by binding a plurality of documents folded in half in a stacked state at a folding line, the image acquiring portion is an image dividing portion configured to divide an image, which is obtained by reading the saddle-stitched booklet in a spread state and includes drawn images for two pages of the saddle-stitched booklet, into images for the respective pages of the saddle-stitched booklet, thereby to acquire the image for each page, and the pair generating portion specifies each of division images obtained by the image dividing portion as a target of generating a pair.

6. An image processing method comprising:

a first step of acquiring an image for each page of a plurality of documents composing a booklet;

a second step of arranging the images acquired in the first step in order of pages of the booklet, and generating pairs from the arranged images, each of the pairs being a pair of pages adjacent to each other in a spread state of the booklet;

a third step of determining whether or not a drawn image is present in a region having a predetermined width and including a boundary portion between two images in each of the pairs generated by a pair generating portion;

a fourth step of determining whether or not the two images are drawn images of letters, and when it is determined that the two images are drawn images of letters, determining whether or not the two images show, by successive letters of the two images, a string of letters that compose one word, then when it is determined that the two images show a string of letters that compose one word, determining that there is drawing continuity of drawn images of letters between the two images, and when it is determined that the two images do not show a string of letters that compose one word, determining that there is no drawing continuity of drawn images of letters between the two images;

a fifth step of determining whether or not the two images have to be combined to each other, based on a determination result in the third step and a determination result in the fourth step; and a sixth step of combining the two images to each other, when it is determined in the fifth step that the two images have to be combined to each other, wherein in the fifth step, it is determined that the two images have to be combined to each other, when it is determined in the third step that a drawn image is not present in the region and it is determined in the fourth step that there is drawing continuity of drawn images of letters between the two images, and it is determined that the two images do not have to be combined to each other, when it is determined in the third step that a drawn image is not present in the region and it is determined in the fourth step that there is no drawing continuity of drawn images of letters between the two images.

* * * * *